Dec. 30, 1947.  E. H. JANES  2,433,760
BRAKE LINING PRESSER
Filed Dec. 5, 1945
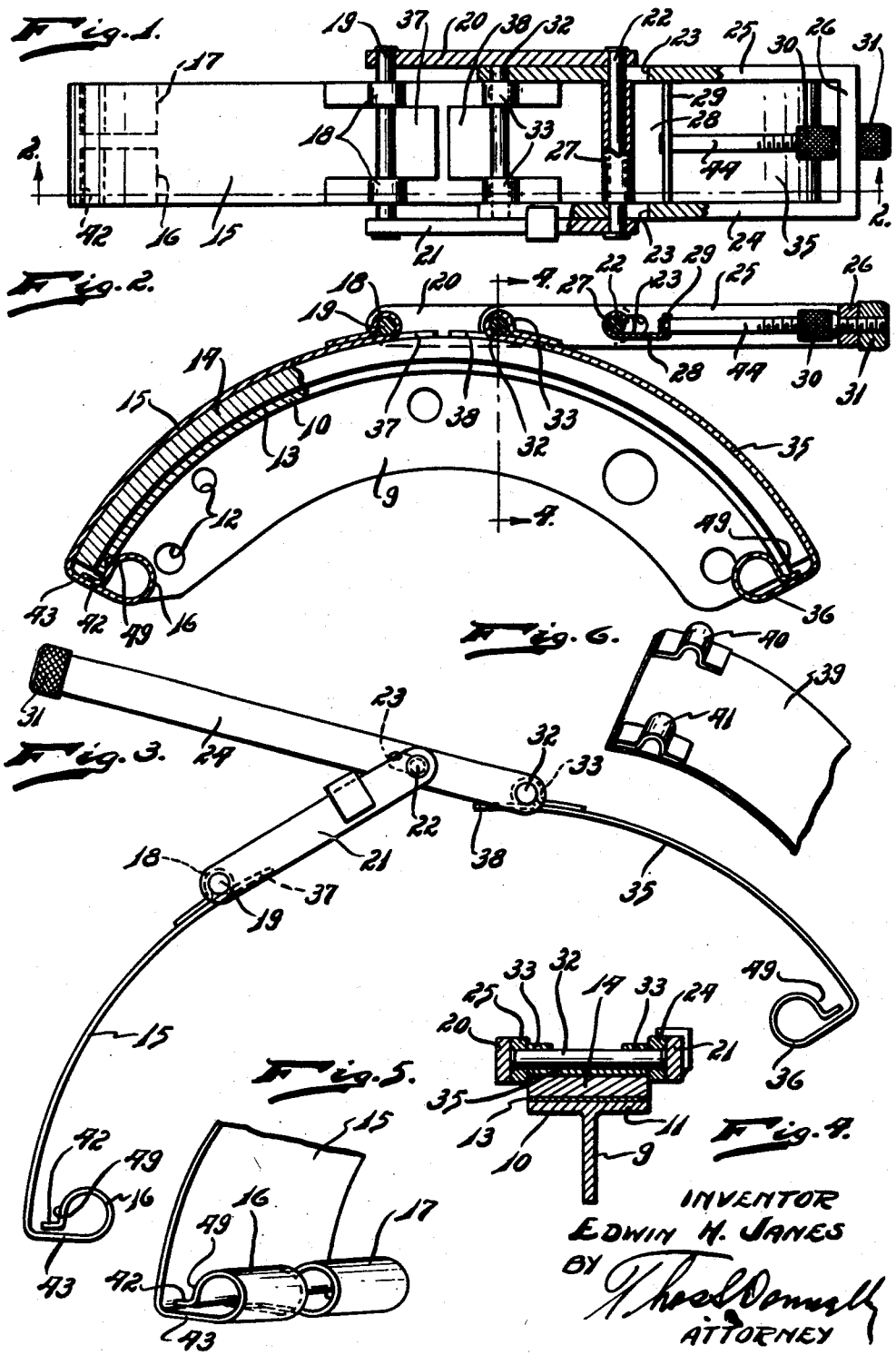
INVENTOR
EDWIN H. JANES
BY Thos L Donnelly
ATTORNEY Patented Dec. 30, 1947

2,433,760

UNITED STATES PATENT OFFICE 2,433,760

BRAKE LINING PRESSER

Edwin H. Janes, Detroit, Mich., assignor to Asbestos Manufacturing Company, Huntington, Ind., a corporation of Indiana Application December 5, 1945, Serial No. 633,022

6 Claims. (Cl. 154—1)

My invention relates to a new and useful improvement in a clamping device adapted for use in applying brake linings to brake shoes. A common practice of fastening brake linings to brake shoes consisted in passing rivets through holes drilled in the brake shoe and in the brake lining and riveting the lining on the shoe. This method of fastening the brake lining on the brake shoe has many disadvantages particularly when the brake lining becomes worn and the rivets are brought into contact with the face of the brake drum. To avoid these disadvantages resort has been had to a method of attaching the brake lining on the brake shoe which consists in cementing or gluing the brake lining to the surface of the brake shoe. The preferable method of so attaching a brake lining to a brake shoe consists in placing between the brake shoe and the brake lining a thin layer of adhesive material in non-adhesive state and then clamping the brake lining on the brake shoe and subjecting the assembly to sufficient heat for setting up the adhesive material.

It is an object of the present invention to provide a clamping device which may be easily and quickly clamped in position on a brake shoe and so arranged and constructed that when moved to clamping position the brake lining is securely held in clamping relation to the layer of adhesive.

Another object of the invention is the provision of a clamping device of this class so constructed and arranged that when moved from non-clamping to clamping position buckling or wrinkling of the brake lining or the layer of adhesive material is avoided.

Another object of the invention is the provision of a clamping device of this class of resilient shoe-engaging members which will engage over the ends of the shoes and prevent any tendency of the clamping device to spring outwardly when moved to clamping position.

Other objects will appear hereinafter.

It is recognized that various modifications and changes may be made in the detail of structure illustrated without departing from the invention and it is intended that such variations and modifications shall be embraced within the claims which form a part hereof.

Forming a part of this specification are drawings in which,

Fig. 1 is a top plan view of the invention showing it applied,

Fig. 2 is a sectional view taken on line 2—2 of Fig. 1,

Fig. 3 is a side elevational view of the invention showing it in partly open position, Fig. 4 is a sectional view taken on line 4—4 of Fig. 2, Fig. 5 is a fragmentary perspective view of the end of one of the clamping members, Fig. 6 is a fragmentary perspective view of the end of one of the clamping members showing a slight modification.

In the drawings I have illustrated the invention applied to a brake shoe which comprises a central radially projecting rib 9 and the brake lining supporting portion embodying the parts 10 and 11. The rib 9 is illustrated with openings 12 which are formed therein for purposes of lightening the structure and for receiving the operating mechanism. Positioned on the peripheral surface of the brake shoe is a layer 13 of adhesive material which when applied is in non-adhesive condition. This adhesive material may be a suitable plastic, a phenolic resin or a suitable strip of adhesive material which when subjected to heat will fuse the parts together. Secured to the peripheral surface of the brake shoe by means of the adhesive 13 is the brake shoe lining 14. This brake shoe lining consists of a strip of suitable material which is cut to the proper length so that it will fit the brake shoe on which it is to be applied. When the lining 14 and the adhesive 13 are placed in position it is desirable that these members be clamped tightly against the brake shoe while being subjected to heat and while cooling after being subjected to heat. To effect this I use a clamping device.

This device comprises a plate 15 formed from resilient metal and having at one of its ends a pair of tongues curled to form open knuckles 16 and 17. Each of these knuckles is provided with the outwardly extending tongue 42 which normally lies in spaced relation to the angularly turned portion 43 as clearly shown in Fig. 3. At the opposite end of the plate 15 is the outwardly projecting tongue 37 which is of less width than the main body of the plate 15 and mounted on the member 15 rearwardly of the tongue 37 are knuckles 18 through which is extended a pin 19 which also extends through one end of the links 20 and 21 and serves to pivotally connect these links to the plate 15. A pin 22 is extended through the opposite ends of the links 20 and 21 and also through a slot 23 formed in the links 24 and 25. These links are connected together at one of their ends by the cross bar 26. Embracing the pin 22 and lying between the links 24 and 25 is a knuckle 27 extending outwardly from which is the plate 28 having the flange-forming portion 29 angularly turned thereto. Pivotally connected at one of its ends to the angularly turned portion or flange 29 is a rod 44 on which are threaded the nuts 30 and 31, the rod 44 being projected through an opening formed in the bar 26 and one of the nuts being positioned on one side of the bar 26 and the other on the other side. Knuckles 33 are formed on the plate 35 which is formed from suitable resilient material. Projected through these knuckles 33 is a pin 32 which also extends through the links 24 and 25 adjacent therein so that the links 24 and 25 are thus pivotally connected to the plate 35. This plate 35 is provided with the tongue 38 which projects outwardly from the knuckle 33 and which is of less width than the main body of the plate 35. At the opposite end of the plate 35 are formed spaced-apart knuckles 36 similar to the knuckles 16 and 17 shown in Fig. 5.

In use when the brake lining 14 and the strip 13 of adhesive material is placed in position on the peripheral surface of the brake shoe the clamping device would be moved to the position shown in Fig. 3 and one end of the brake shoe would be engaged in the space 49 which lies between the knuckle 36 or the knuckles 16 and 17 and the inner face of the plate 15 or the plate 35 as the case may be. In engaging the end of the brake shoe in this space the knuckles 16 and 17 or the knuckle 36 as the case may be would be sprung out of normal position into the position shown in Fig. 2 so that the brake shoe lining and the layer 13 of adhesive material would be securely engaged and held in fixed relation at the end of the brake shoe. This pinching or gripping effect will also take place even though there is a variation in the thickness of the brake shoe lining. Experience has shown that the brake shoe lining is not always made of the same thickness and by forming the ends of the members 15 and 35 with the yieldable knuckles as described the space 49 may be reduced in size when a brake shoe lining of greater thickness than ordinary is used. This is accomplished by reducing the size of the knuckle. The link 25 would then be swung over hard to the position shown in Fig. 2 so as to draw the opposite ends of the clamping device into engagement with the opposite end of the brake shoe and when this engagement takes effect the extreme ends of the brake shoe lining 14 and the adhesive 13 would again be pinched and clamped in fixed relation to the end of the brake shoe by the spring knuckles at the end of the plate 35 or the plate 15 as the case may be. The links 24 and 25 would be swung fully to the position shown in Fig. 2 and as this movement takes effect the plates 15 and 35 would move downwardly into close engagement with the outer face of the brake shoe lining 14 and then move into approach to each other so as to exert a clamping pressure on the brake shoe lining throughout its entire surface. It will be noted that when the plates 15 and 35 are brought downwardly into engagement with the outer face of the brake shoe lining they exert a pressing effect on the brake shoe lining downwardly towards the outer surface of the brake shoe. As the plates 15 and 35 move into relative approach to each other this downward pressure on the brake shoe lining continues and increases. Experience has shown that when the brake shoe lining is gripped at the end and when the pressure is exerted as described a buckling or wrinkling of the brake shoe lining is prevented. It is believed obvious that the links 20 and 21 co-operating with the links 24 and 25 form a toggle and when moved to fully clamped position as shown in Fig. 2 the toggle is swung slightly past center so that the brake shoe lining and the adhesive 13 are firmly clamped against the brake shoe. When this clamping has been effected the assembly may then be placed in an oven or other suitable heat source until the adhesive has fused. Experience has shown that when a brake shoe lining is secured in this manner with a proper clamping and using proper adhesive a most efficient assemblage is thus effected.

By adjusting the nuts 30 and 31 on the threaded stem 44 the links 24 and 25 will be moved relatively to the links 20 and 21 so that the toggle may thus be shortened or lengthened and thus the clamping pressure exerted by the plates 35 and 15 may be adjusted. This sometimes becomes necessary because of a variation to some slight extent of the length of the brake shoes on which the lining is to be applied and to accommodate the various thicknesses of lining or adhesive used.

In Fig. 6 I have shown a slight modification in which the clamping plate 39 is provided with the knuckles 40 and 41 mounted at the end thereof so that the tongues 37 and 38 indicated in Fig. 1 are eliminated. However, use of the tongue has proven most efficient as the area of contact of the plates 35 and 15 with the outer surface of the brake shoe lining 14 is thus reduced and as these plates slide over the brake shoe lining no buckling or wrinkling or gouging in to the brake shoe lining is effected.

While I prefer to use a strip 13 of adhesive material which is in a non-adhesive stage and which when subjected to heat will fuse the parts together it is believed obvious that the invention may be used when other forms of adhesives are used. For instance the face of the brake shoe lining which is opposed to the face of the brake shoe may be coated with adhesive in any desirable manner and likewise if desired the outer face of the brake shoe may have a layer of adhesive applied to it. This layer of adhesive may be in an adhesive condition when the clamping of the brake shoe to the brake shoe lining is effected or it may be in a non-adhesive condition as it is believed obvious that the clamping of the brake shoe lining and affixing the brake shoe lining to the brake shoe in the manner described may be accomplished with any suitable form of adhesive which will effect the necessary bonding of these parts together.

Experience has shown that a clamping device constructed in this manner is most efficient for securing a brake shoe lining on a brake shoe and entirely eliminates any buckling or wrinkling of the brake shoe lining when assembled on the brake shoe. The structure is also one which is compact so that when the assemblage is arranged as shown in Fig. 1 a minimum of space is occupied.

What I claim as new is:

1. A clamping device of the class described comprising: a pair of resilient clamping plates; an open knuckle formed on one end of each of said plates and doubled inwardly of the plate in spaced relation thereto; and a toggle mechanism for connecting the opposite ends of said plates.

2. A clamping device of the class described comprising: a pair of resilient clamping plates; an open knuckle formed on one end of each of said plates and doubled inwardly of the plate in spaced relation thereto; and a toggle mechanism for connecting the opposite ends of said plates; and means for adjusting the length of said toggle mechanism.

3. A clamping mechanism for clamping a brake shoe lining on a brake shoe comprising a pair of resilient plates adapted for overlying and engaging the outer surface of the brake shoe lining and pressing the same against the outer surface of the brake shoe; means on each of said plates for engaging the inner surface of the brake shoe at the end and clamping the end of the liner against the brake shoe at the end; and means for moving said plates toward each other at their opposite ends and into clamping relation against the outer surface of the brake shoe lining throughout substantially its entire area.

4. A clamping mechanism for clamping a brake shoe lining on a brake shoe comprising a pair of resilient plates adapted for overlying and engaging the outer surface of the brake shoe lining and pressing the same against the outer surface of the brake shoe; means on each of said plates for engaging the inner surface of the brake shoe at the end and clamping the end of the liner against the brake shoe at the end; and means for moving said plates toward each other at their opposite ends and into clamping relation against the outer surface of the brake shoe lining throughout substantially its entire area; and means for adjusting said moving means.

5. A clamping device of the class described adapted for clamping a brake shoe lining on the outer surface of a brake shoe comprising a pair of resilient clamping plates; a yieldable engagement member on one end of each of said plates for overlying the end of the brake shoe and clamping against the inner surface thereof for retaining the end of a brake shoe lining in a close contact with the outer surface of the brake shoe; a toggle mechanism connected with the opposite ends of said plates and adapted upon actuation for drawing said ends into engagement with each other and forcing the same into clamping relation with the brake shoe lining for forcing the same against the outer surface of the brake shoe.

6. A clamping device of the class described adapted for clamping a brake shoe lining on the outer surface of a brake shoe comprising a pair of resilient clamping plates; a yieldable engagement member on one end of each of said plates for overlying the end of the brake shoe and clamping against the inner surface thereof for retaining the end of a brake shoe lining in close contact with the outer surface of the brake shoe; a toggle mechanism connected with the opposite ends of said plates and adapted upon actuation for drawing said ends into engagement with each other and forcing the same into clamping relation with the brake shoe lining for forcing the same against the outer surface of the brake shoe; and means for adjusting the tension of said toggle mechanism.

EDWIN H. JANES.

REFERENCES CITED

The following references are of record in the file of this patent:

UNITED STATES PATENTS

| Number | Name | Date |
| --- | --- | --- |
| 2,358,483 | Tilden | Sept. 19, 1944 |
| 1,598,561 | Coomer | Aug. 31, 1926 |
| 1,903,058 | McNaught et al. | Mar. 28, 1933 |
| 1,600,672 | Janowski | Sept. 21, 1926 |
| 225,216 | Earle | Mar. 9, 1880 |